(12) United States Patent
Liu et al.

(10) Patent No.: US 8,442,338 B2
(45) Date of Patent: May 14, 2013

(54) VISUALLY OPTIMIZED QUANTIZATION

(75) Inventors: Wei Liu, San Jose, CA (US); Mohammad Gharavi-Alkhansari, Santa Clara, CA (US); Ehsan Maani, San Jose, CA (US)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 13/037,012

(22) Filed: Feb. 28, 2011

(65) Prior Publication Data

US 2012/0218440 A1    Aug. 30, 2012

(51) Int. Cl.
   *G06K 9/00* (2006.01)
(52) U.S. Cl.
   USPC .......................................... 382/251; 382/248
(58) Field of Classification Search .................. 382/239, 382/248, 250, 251, 281; 375/240.03, 240.18, 375/240.2
   See application file for complete search history.

(56) References Cited

U.S. PATENT DOCUMENTS

| | | | |
|---|---|---|---|
| 6,959,116 B2 | 10/2005 | Sezer et al. | |
| 2008/0310512 A1* | 12/2008 | Ye et al. | 375/240.16 |
| 2009/0257489 A1 | 10/2009 | Karczewicz et al. | |
| 2010/0208806 A1 | 8/2010 | Yu et al. | |
| 2011/0170594 A1* | 7/2011 | Budagavi et al. | 375/240.13 |
| 2012/0082212 A1* | 4/2012 | Sadafale et al. | 375/240.2 |

OTHER PUBLICATIONS

Robert A. Cohen, et al. "Direction-Adaptive Transforms for Coding Prediction Residuals", IEEE 17th International Conference on Image Proceedings, Sep. 26-29, 2012, Hong Kong, pp. 185-187, ICIP2012, Mitsubishi Electronic Research Laboratories, Cambridge, MA 02139, Leibniz Univeristat Hannover, Germany.

Xin Zhao, et al."Rate-Distortion Optimized Transform for Intra-Frame Coding", IEEE, 2012, pp. 1414-1417, ICIP2010, Key Lab of Intelligent Information Processing, Institute of Computing Technology, Chinese Academy of Sciences, Beijing 100190, China, Graduate University of Chinese Academy of Sciences, Beijing 100049, China, Institute of Digital Media, Peking University, Beijing 100871, China.

* cited by examiner

*Primary Examiner* — Phuoc Tran
(74) *Attorney, Agent, or Firm* — Haverstock & Owens LLP

(57) ABSTRACT

Visually optimized quantization is described herein. Specifically, the visually optimized quantization is for arbitrary block-based transforms such as Mode-Dependent Directional Transform (MDDT). The compression method involves the process of taking a discrete cosine transform of an MDDT basis function, obtaining the frequency weights, and computing the contrast sensitivity function for each of the frequency components. The overall effect of the distortion is calculated by error pooling and the quantization matrix is the inverse proportional of the overall effect.

26 Claims, 4 Drawing Sheets

MDDT basis function at (m, n)

VISUALLY OPTIMIZED QUANTIZATION

FIELD OF THE INVENTION

The present invention relates to the field of image/video processing. More specifically, the present invention relates to optimized quantization in video coding for better visual quality.

BACKGROUND OF THE INVENTION

Considerable research has been conducted in the field of data compression, especially the compression of digital information of digital images. Digital images comprise a rapidly growing segment of the digital information stored and communicated by science, commerce, industry and government. Digital image transmission has gained significant importance in highly advanced television systems, such as high definition television using digital information. Because a relatively large number of digital bits are required to represent digital images, a difficult burden is placed on the infrastructure of the computer communication networks involved with the creation, transmission and re-creation of digital images. For this reason, there is a need to compress digital images to a smaller number of bits, by reducing redundancy and invisible image components of the images themselves.

The Discreet Cosine Transform is employed in a number of current and future international standards, concerned with digital image compression, commonly referred to as JPEG and MPEG, which are acronyms for Joint Photographic Experts Group and Moving Pictures Experts Group, respectively. After a block of pixels undergoes a Discrete Cosine Transform (DCT), the resulting transform coefficients are subject to compression by thresholding and quantization operations. Thresholding involves setting all coefficients whose magnitude is smaller than a threshold value equal to zero, whereas quantization involves scaling a coefficient by step size and rounding off to the nearest integer.

Commonly, the quantization of each DCT coefficient is determined by an entry in a quantization matrix. It is this matrix that is primarily responsible for the perceived image quality and the bit rate of the transmission of the image. The perceived image quality is important because the human visual system is able to tolerate a certain amount of degradation of an image without being alerted to a noticeable error. Therefore, certain images are able to be transmitted at a low bit rate, whereas other images are not able to tolerate any degradation and should be transmitted at a higher bit rate in order to preserve their informational content.

SUMMARY OF THE INVENTION

Visually optimized quantization is described herein. Specifically, the visually optimized quantization is for arbitrary block-based transforms such as Mode-Dependent Directional Transform (MDDT). The compression method involves the process of taking a discrete cosine transform of an MDDT basis function, obtaining the frequency weights, and computing the contrast sensitivity function for each of the frequency components. The overall effect of the distortion is calculated by error pooling and the quantization matrix is the inverse proportional of the overall effect.

In one aspect, a method of performing optimized quantization programmed in a memory in a device comprises taking a discrete cosine transform of a basis function of an arbitrary block transform to determine frequency weights of frequency components, computing an individual contrast sensitivity function for each of the frequency components, computing an overall effect of distortion of the frequency components using error pooling and generating a quantization matrix using the overall effect of the error pooling. In some embodiments, the arbitrary block transform is a mode-dependent directional transform. The quantization matrix is applied to an image during compression of the image. The contrast sensitivity function comprises a one dimensional contrast sensitivity function. The contrast sensitivity function comprises a two dimensional contrast sensitivity function. Computing the contrast sensitivity function utilizes a threshold. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In another aspect, a system for performing optimized quantization programmed in a memory in a device comprises a discreet cosine transform module for taking a discrete cosine transform of a basis function of an arbitrary block transform to determine frequency weights of frequency components, a contrast sensitivity function module for computing an individual contrast sensitivity function for each of the frequency components, an error pooling module for computing an overall effect of distortion of the frequency components using error pooling and a quantization matrix module for generating a quantization matrix using the overall effect of the error pooling. In some embodiments, the arbitrary block transform is a mode-dependent directional transform. The quantization matrix is applied to an image during compression of the image. The contrast sensitivity function comprises a one dimensional contrast sensitivity function. The contrast sensitivity function comprises a two dimensional contrast sensitivity function. Computing the contrast sensitivity function utilizes a threshold. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In yet another aspect, a camera device comprises an image acquisition component for acquiring an image, a processing component for processing the image by taking a discrete cosine transform of a basis function of an arbitrary block transform to determine frequency weights of frequency components, computing an individual contrast sensitivity function for each of the frequency components, computing an overall effect of distortion of the frequency components using error pooling and generating a quantization matrix using the overall effect of the error pooling and a memory for storing the processed image. In some embodiments, the arbitrary block transform is a mode-dependent directional transform. The quantization matrix is applied to the image during compression of the image. The contrast sensitivity function comprises a one dimensional contrast sensitivity function. The contrast sensitivity function comprises a two dimensional contrast sensitivity function. Computing the contrast sensitivity function utilizes a threshold.

In another aspect, an encoder comprises an intracoding module for encoding an image only using information from the image and an intercoding module for encoding the image using information from previously reconstructed images and in either intracoding or intercoding, if an employed block transform is different from a discrete cosine transform, visually optimized quantization is applied, including a quantization component for taking the discrete cosine transform of a basis function of an arbitrary block transform to determine frequency weights of frequency components, computing an individual contrast sensitivity function for each of the frequency components, computing an overall effect of distortion of the frequency components using error pooling and generating a quantization matrix using the overall effect of the error pooling. In some embodiments, the arbitrary block transform is a mode-dependent directional transform. The quantization matrix is applied to the image during compression of the image. The contrast sensitivity function comprises a one dimensional contrast sensitivity function. The contrast sensitivity function comprises a two dimensional contrast sensitivity function. Computing the contrast sensitivity function utilizes a threshold.

DETAILED DESCRIPTION OF THE PREFERRED EMBODIMENT

For the next generation video coding standard, other transforms are used in addition to DCT. For these next generation video coding standards, additional information is available which makes DCT not the optimal transform. For example, in Advanced Video Coding (AVC), for intracoding, there are 8 prediction directions defined in addition to DCT coefficients. With this direction information, DCT transform is not the best transform for the prediction residual. For example, one better transform is Mode-Dependent Directional Transform (MDDT). For each direction, a row transform and a column transform are defined. Each of them is trained based on a Karhunen Loeve Transform (KLT). The row transform and column transform implemented using DCT are also referred to as 2D DCT. In MDDT, the row transform and column transform are defined based on the different block sizes and directions. For arbitrary basis functions/transforms, a visually optimized quantization is able to be determined.

Just Noticeable Difference (JND)

JND is how much an image or part of an image is able to be modified before the modification is noticeable to a human eye. A quantization matrix is determined based on the JND.

The JND model contains the following components: luminance masking, Contrast Sensitivity Functions (CSF) and error pooling. Regarding luminance masking, if an image is bright, the image is able to be modified more than a darker image before the modification is noticeable. Thus, the JND is larger for brighter images and smaller for darker images.

CSF is the sensitivity of human eyes to a single frequency component. Conventional DCT/DWT quantization is based on this. In general, people are more sensitive to low frequency components than high frequency components. Thus, the JND is larger at high frequency components and smaller at low frequency components.

Error pooling is a joint effect of distortion in multiple frequency bands/components. Unlike CSF, error pooling takes into account the combination of multiple components instead of a single component.

CSF

Figure 1:
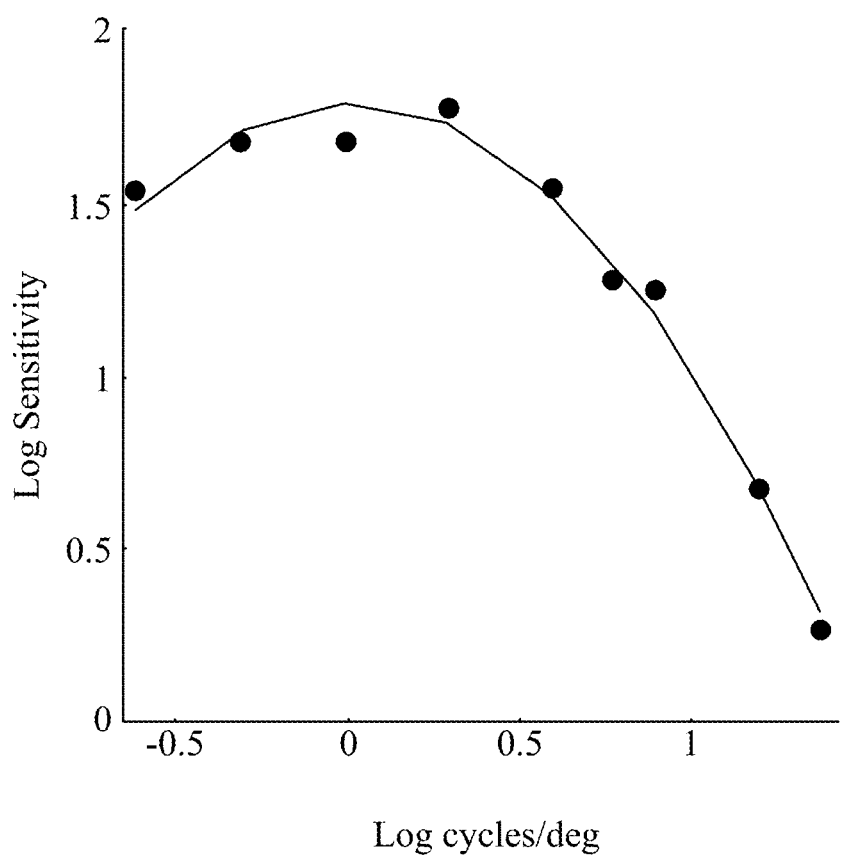
FIG. 1 illustrates a graph of log sensitivity versus cycles/degrees.

An exemplary 1D CSF is a log-parabola function:

log T=log $T_{min}$−k(log f−log $f_0$)$^2$, where T is a threshold, $T_{min}$, k and $f_0$ are constants. Depending on a given frequency, the threshold is able to be derived. If the threshold T is large, quantization is able to be coarser. FIG. 1 illustrates a graph of the 1D CSF.

An exemplary 2D CSF is adjusted by its angle:

$$\log T_{m,n} = \log \frac{T_{min}}{r + (1-r)\cos^2 2\theta} - k(\log f_{m,n} - \log f_0)^2$$

where r is a constant, 0<r<1. θ is the angle of the spatial frequency. The 2D CSF is similar to the 1D CSF with the main difference being that $T_{min}$ is modified by r and θ in the 2D CSF.

Error Pooling

For an arbitrary block transform, one basis function is able to include multiple frequency components. Quantization introduces noise to multiple frequencies, and the distortions at different bands interact with each other. The pooling function handles the multiple frequency interaction. The pooling function is modeled as:

$$p_{ij} = \left(\sum_k |d_{ijk}|^\beta\right)^{1/\beta}$$

If the visual distortion introduced to a single frequency, $d_{ijk}$, is known, then the total distortion is able to be calculated using the pooling function. To calculate the distortion $d_{ij}$, ij is a known position of the basis function. Additionally, a DCT is applied to a basis function such as a MDDT basis function which results in $a_{ij}$. The $a_{ij}$ is the contribution of the DCT basis function towards a single frequency which is then normalized by $T_{ij}$, the visual sensitivity threshold. Thus, $$\frac{a_{i,j}}{T_{i,j}}$$

is a reasonable $d_{ij}$. Additionally, the quantization is inversely proportional to the sensitivity, since the more sensitive an image is, the less quantization allowed.

Figure 2:
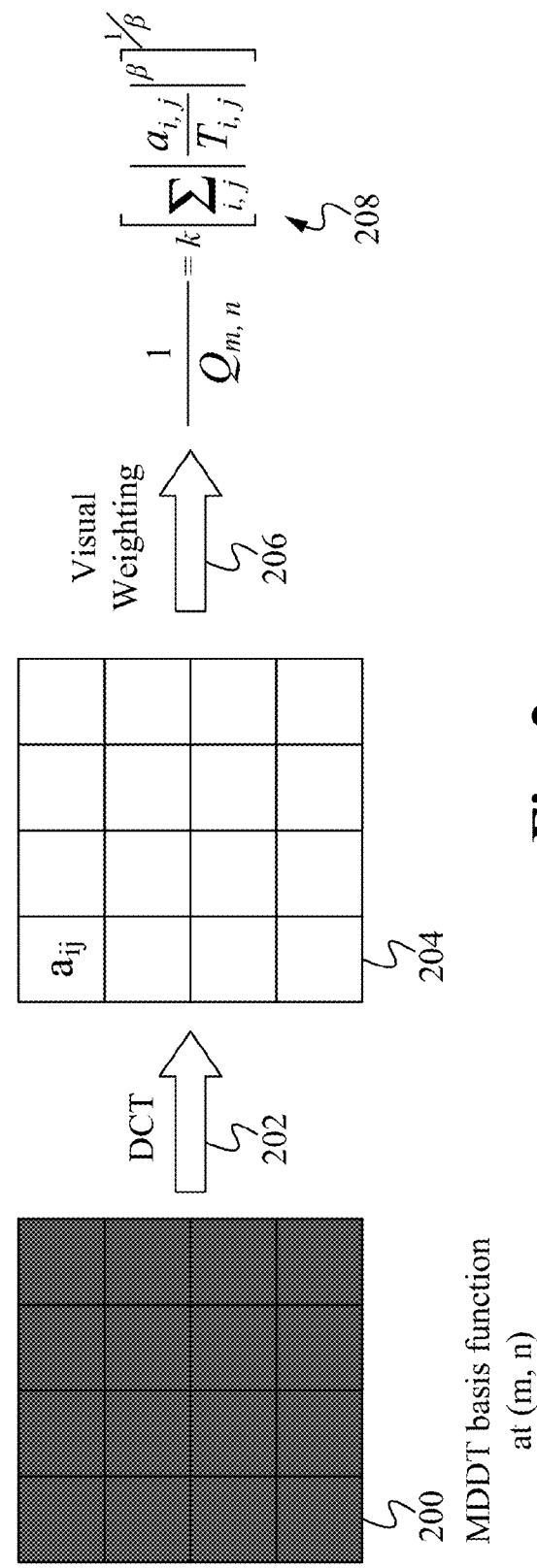
FIG. 2 illustrates a flow diagram of the method of visually optimized quantization according to some embodiments.

FIG. 2 illustrates an exemplary flow diagram of the method of visually optimized quantization according to some embodiments. In the step 202, a DCT is taken of a basis function of an arbitrary block transform 200 such as an MDDT basis function to determine frequency weights 204. Then, a visual weighting is applied in the step 206. The visual weighting includes computing individual CSF functions for each frequency component. The visual weighting also includes error pooling. Then, the quantization matrix is inverse proportional to the overall effect 208. In some embodiments, fewer or additional steps are included.

Figure 3:
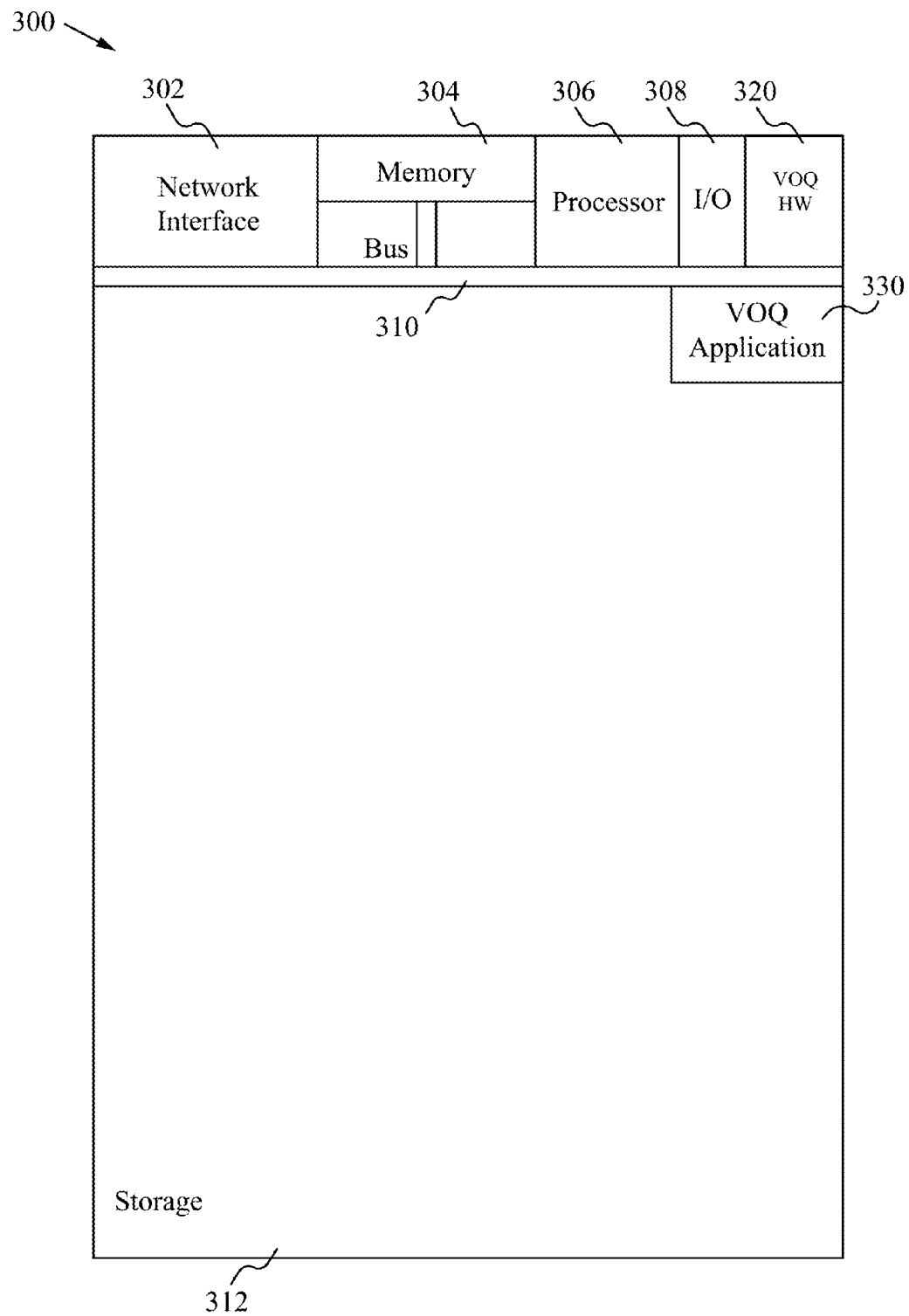
FIG. 3 illustrates a block diagram of an exemplary computing device configured to implement visually optimized quantization according to some embodiments.

FIG. 3 illustrates a block diagram of an exemplary computing device 300 configured to implement visually optimized quantization according to some embodiments. The computing device 300 is able to be used to process information such as images and videos. For example, a computing device 300 is able to encode video using visually optimized quantization. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, Blu-ray Disc™, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, display, printer, modem, touchscreen, button interface and other devices. Visually optimized quantization application(s) 330 used to perform the visually optimized quantization are likely to be stored in the storage device 312 and memory 304 and processed as applications are typically processed. More or less components than shown in FIG. 3 are able to be included in the computing device 300. In some embodiments, visually optimized quantization hardware 320 is included. Although the computing device 300 in FIG. 3 includes applications 330 and hardware 320 for implementing visually optimized quantization, the visually optimized quantization is able to be implemented on a computing device in hardware, firmware, software or any combination thereof.

In some embodiments, the visually optimized quantization application(s) 330 include several applications and/or modules. In some embodiments, the visually optimized quantization application(s) 330 include modules such as a DCT module for taking a discrete cosine transform of a basis function of an arbitrary block transform (such as mode-dependent directional transform) to determine frequency weights, a CSF module for computing an individual contrast sensitivity functions for each frequency components, an error pooling for computing an overall effect of distortion using error pooling and a quantization matrix for generating a quantization matrix using the error pooling. In some embodiments, fewer or additional modules and/or sub-modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-Ray® writer/player, a television, a home entertainment system or any other suitable computing device.

Figure 4:
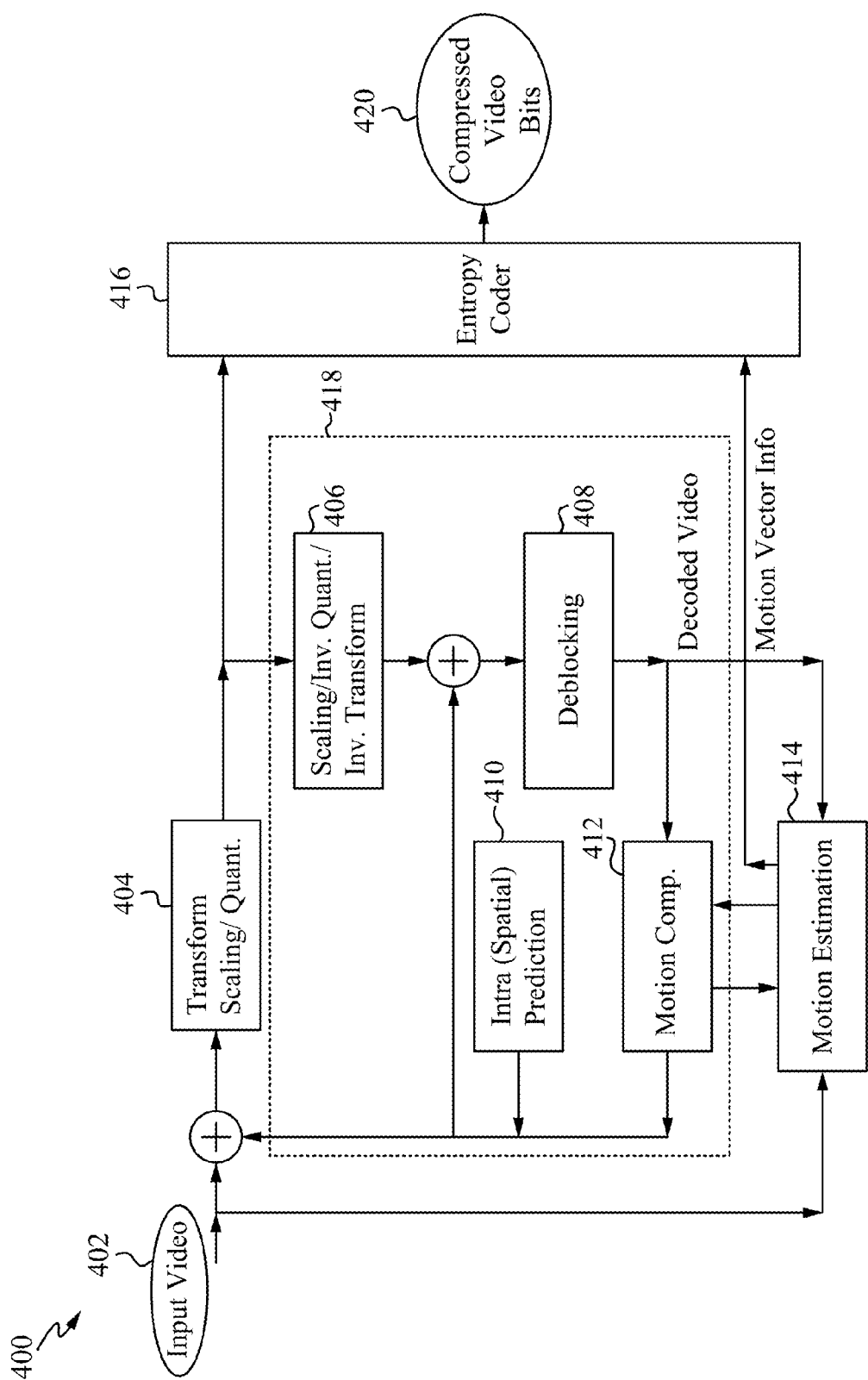
FIG. 4 illustrates a block diagram of a video coding layer according to some embodiments.

FIG. 4 illustrates a block diagram of a video coding layer 400 of a macroblock. The video coding layer 400 (e.g. the encoder) includes a combination of temporal and spatial predictions along with transform coding. An input video 402 is received and split into a plurality of blocks. The first picture of a sequence is usually "intra" coded using only information contained within itself. Each part of a block in an intra frame is then predicted at the intra prediction module 410 using spatially neighboring samples of previously coded blocks. The encoding process chooses which neighboring samples are utilized for intra prediction and how they are used. This process is conducted at the local decoder 418 as well as at the encoder 400. For the rest of the pictures of a sequence, usually "inter" coding is used. Inter coding implements motion compensation 412 from other previously decoded pictures. The encoding process for inter prediction/motion estimation at the motion estimation module 414 includes choosing motion data, determining the reference picture and a spatial displacement that is applied to all samples of the block. The motion data is transmitted as side information which is used by the encoder 400 and the local decoder 418.

The difference between the original and the predicted block is referred to as the residual of the prediction. The residual is transformed, and the transform coefficients are scaled and quantized at the transform and scaling quantization module 404. As described herein, visually optimized quantization is implemented. Each block is transformed using an integer transform, and the transform coefficients are quantized and transmitted using entropy-coding methods. An entropy encoder 416 uses a codeword set for all elements except the quantized transform coefficients. For the quantized transform coefficients, Context Adaptive Variable Length Coding (CAVLC) or Context Adaptive Binary Arithmetic Coding (CABAC) is utilized. The deblocking filter 408 is implemented to control the strength of the filtering to reduce the blockiness of the image.

The encoder 400 also contains the local decoder 418 to generate prediction reference for the next blocks. The quantized transform coefficients are inverse scaled and inverse transformed 406 in the same way as the encoder side which gives a decoded prediction residual. The decoded prediction residual is added to the prediction, and the combination is directed to the deblocking filter 408 which provides decoded video as output. Ultimately, the entropy coder 416 produces compressed video bits 420 of the originally input video 402.

To utilize the visually optimized quantization, a device such as a digital camera or camcorder is used to acquire an image or video of the scene. The visually optimized quantization is automatically performed. The visually optimized quantization is also able to be implemented after the image is acquired to perform post-acquisition processing.

In operation, visually optimized quantization is for block-based transforms. The compression method involves the process of taking a discrete cosine transform of an MDDT, obtain the frequency weights, and computing the contrast sensitivity function for each of the frequency components. The overall effect of the distortion is calculated by error pooling and the quantization matrix is the inverse proportional of the overall effect. By implementing visually optimized quantization, compression efficiency is improved.

SOME EMBODIMENTS OF VISUALLY OPTIMIZED QUANTIZATION

1. A method of performing optimized quantization programmed in a memory in a device comprising:
    a. taking a discrete cosine transform of a basis function of an arbitrary block transform to determine frequency weights of frequency components;
    b. computing an individual contrast sensitivity function for each of the frequency components;
    c. computing an overall effect of distortion of the frequency components using error pooling; and
    d. generating a quantization matrix using the overall effect of the error pooling.
2. The method of clause 1 wherein the arbitrary block transform is a mode-dependent directional transform.
3. The method of clause 1 wherein the quantization matrix is applied to an image during compression of the image.
4. The method of clause 1 wherein the contrast sensitivity function comprises a one dimensional contrast sensitivity function.

5. The method of clause 1 wherein the contrast sensitivity function comprises a two dimensional contrast sensitivity function.
6. The method of clause 1 wherein computing the contrast sensitivity function utilizes a threshold.
7. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
8. A system for performing optimized quantization programmed in a memory in a device comprising:
   a. a discreet cosine transform module for taking a discrete cosine transform of a basis function of an arbitrary block transform to determine frequency weights of frequency components;
   b. a contrast sensitivity function module for computing an individual contrast sensitivity function for each of the frequency components;
   c. an error pooling module for computing an overall effect of distortion of the frequency components using error pooling; and
   d. a quantization matrix module for generating a quantization matrix using the overall effect of the error pooling.
9. The system of clause 8 wherein the arbitrary block transform is a mode-dependent directional transform.
10. The system of clause 8 wherein the quantization matrix is applied to an image during compression of the image.
11. The system of clause 8 wherein the contrast sensitivity function comprises a one dimensional contrast sensitivity function.
12. The system of clause 8 wherein the contrast sensitivity function comprises a two dimensional contrast sensitivity function.
13. The system of clause 8 wherein computing the contrast sensitivity function utilizes a threshold.
14. The system of clause 8 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
15. A camera device comprising:
   a. an image acquisition component for acquiring an image;
   b. a processing component for processing the image by:
      i. taking a discrete cosine transform of a basis function of an arbitrary block transform to determine frequency weights of frequency components;
      ii. computing an individual contrast sensitivity function for each of the frequency components;
      iii. computing an overall effect of distortion of the frequency components using error pooling; and
      iv. generating a quantization matrix using the overall effect of the error pooling; and
   c. a memory for storing the processed image.
16. The camera device of clause 15 wherein the arbitrary block transform is a mode-dependent directional transform.
17. The camera device of clause 15 wherein the quantization matrix is applied to the image during compression of the image.
18. The camera device of clause 15 wherein the contrast sensitivity function comprises a one dimensional contrast sensitivity function.
19. The camera device of clause 15 wherein the contrast sensitivity function comprises a two dimensional contrast sensitivity function.
20. The camera device of clause 15 wherein computing the contrast sensitivity function utilizes a threshold.
21. An encoder comprising:
   a. an intracoding module for encoding an image only using information from the image;
   b. an intercoding module for encoding the image using information from previously reconstructed images; and
   c. in either intracoding or intercoding, if an employed block transform is different from a discrete cosine transform, visually optimized quantization is applied, including a quantization component for:
      i. taking the discrete cosine transform of a basis function of an arbitrary block transform to determine frequency weights of frequency components;
      ii. computing an individual contrast sensitivity function for each of the frequency components;
      iii. computing an overall effect of distortion of the frequency components using error pooling; and
      iv. generating a quantization matrix using the overall effect of the error pooling.
22. The encoder of clause 21 wherein the arbitrary block transform is a mode-dependent directional transform.
23. The encoder of clause 21 wherein the quantization matrix is applied to the image during compression of the image.
24. The encoder of clause 21 wherein the contrast sensitivity function comprises a one dimensional contrast sensitivity function.
25. The encoder of clause 21 wherein the contrast sensitivity function comprises a two dimensional contrast sensitivity function.
26. The encoder of clause 21 wherein computing the contrast sensitivity function utilizes a threshold.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of performing optimized quantization programmed in a memory in a device comprising:
   a. taking a discrete cosine transform of a basis function of an arbitrary block transform to determine frequency weights of frequency components;
   b. computing an individual contrast sensitivity function for each of the frequency components;
   c. computing an overall effect of distortion of the frequency components using error pooling; and
   d. generating a quantization matrix using the overall effect of the error pooling.
2. The method of claim 1 wherein the arbitrary block transform is a mode-dependent directional transform.
3. The method of claim 1 wherein the quantization matrix is applied to an image during compression of the image.

4. The method of claim 1 wherein the contrast sensitivity function comprises a one dimensional contrast sensitivity function.

5. The method of claim 1 wherein the contrast sensitivity function comprises a two dimensional contrast sensitivity function.

6. The method of claim 1 wherein computing the contrast sensitivity function utilizes a threshold.

7. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

8. A system for performing optimized quantization programmed in a memory in a device comprising:
   a. a discreet cosine transform module for taking a discrete cosine transform of a basis function of an arbitrary block transform to determine frequency weights of frequency components;
   b. a contrast sensitivity function module for computing an individual contrast sensitivity function for each of the frequency components;
   c. an error pooling module for computing an overall effect of distortion of the frequency components using error pooling; and
   d. a quantization matrix module for generating a quantization matrix using the overall effect of the error pooling.

9. The system of claim 8 wherein the arbitrary block transform is a mode-dependent directional transform.

10. The system of claim 8 wherein the quantization matrix is applied to an image during compression of the image.

11. The system of claim 8 wherein the contrast sensitivity function comprises a one dimensional contrast sensitivity function.

12. The system of claim 8 wherein the contrast sensitivity function comprises a two dimensional contrast sensitivity function.

13. The system of claim 8 wherein computing the contrast sensitivity function utilizes a threshold.

14. The system of claim 8 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

15. A camera device comprising:
   a. an image acquisition component for acquiring an image;
   b. a processing component for processing the image by:
      i. taking a discrete cosine transform of a basis function of an arbitrary block transform to determine frequency weights of frequency components;
      ii. computing an individual contrast sensitivity function for each of the frequency components;
      iii. computing an overall effect of distortion of the frequency components using error pooling; and
      iv. generating a quantization matrix using the overall effect of the error pooling; and
   c. a memory for storing the processed image.

16. The camera device of claim 15 wherein the arbitrary block transform is a mode-dependent directional transform.

17. The camera device of claim 15 wherein the quantization matrix is applied to the image during compression of the image.

18. The camera device of claim 15 wherein the contrast sensitivity function comprises a one dimensional contrast sensitivity function.

19. The camera device of claim 15 wherein the contrast sensitivity function comprises a two dimensional contrast sensitivity function.

20. The camera device of claim 15 wherein computing the contrast sensitivity function utilizes a threshold.

21. An encoder comprising:
   a. an intracoding module for encoding an image only using information from the image;
   b. an intercoding module for encoding the image using information from previously reconstructed images; and
   c. in either intracoding or intercoding, if an employed block transform is different from a discrete cosine transform, visually optimized quantization is applied, including a quantization component for:
      i. taking the discrete cosine transform of a basis function of an arbitrary block transform to determine frequency weights of frequency components;
      ii. computing an individual contrast sensitivity function for each of the frequency components;
      iii. computing an overall effect of distortion of the frequency components using error pooling; and
      iv. generating a quantization matrix using the overall effect of the error pooling.

22. The encoder of claim 21 wherein the arbitrary block transform is a mode-dependent directional transform.

23. The encoder of claim 21 wherein the quantization matrix is applied to the image during compression of the image.

24. The encoder of claim 21 wherein the contrast sensitivity function comprises a one dimensional contrast sensitivity function.

25. The encoder of claim 21 wherein the contrast sensitivity function comprises a two dimensional contrast sensitivity function.

26. The encoder of claim 21 wherein computing the contrast sensitivity function utilizes a threshold.

* * * * *